3,003,884
FRESH MEAT PACKAGE AND METHOD
William Page Andrews, Richmond, Va., assignor to E. I. du Pont de Nemours and Company, Wilmington, Del., a corporation of Delaware
No Drawing. Filed Mar. 10, 1958, Ser. No. 720,060
2 Claims. (Cl. 99—174)

This invention relates to the packaging of meat products and more especially to the packaging of fresh meats in transparent film wrapping materials.

This application is a continuation-in-part of my copending application Serial No. 648,789, filed March 27, 1957, now abandoned.

It has been found that the transparent, flexible (and generally moistureproof) films such as plain and moistureproofed regenerated cellulose films, polyethylene film, rubber hydrochloride film, polyvinylidene chloride copolymer films, glassine paper, etc. now widely employed in the packaging of a variety of products including foodstuffs, cannot be used to most effectively and advantageously package fresh meats, such as beef, pork, lamb and veal, primarily because these known films do not possess the peculiar combination of properties essential to a satisfactory fresh meat wrapper where it is desired to prepackage the meat in a protective display wrapper for vending in self-service markets.

Probably the two most important factors to be taken into account in providing a satisfactory transparent film wrap for packaging fresh meats are (1) the oxygen permeability of the packaging film which relates primarily to color retention and hence appearance of the packaged meat; and (2) the water vapor permeability of the packaging film which bears on the condition, and also on the appearance of the packaged meat.

The factors involved in color retention of fresh meats are the chemical reactions of the meat surface (1) pseudo-oxidation of the purple hemoglobin to the loosely coordinated complex, oxyhemoglobin which has the brilliant red color characteristic of fresh beef and (2) true oxidation of the hemoglobin to methemoglobin, which has the objectionable gray-brown colors customers dislike. The ideal film must have a high enough oxygen permeability to maintain the brilliant red oxyhemoglobin color and at the same time retard the formation of methemoglobin. Furthermore, it must possess a low enough water vapor permeability to prevent excess drying of meat.

Freshly cut beef that has been brought to "bloom" (i.e., is exposed to air for a few minutes) rapidly changes to the purple color of hemoglobin when placed in an atmosphere of nitrogen and carbon dioxide. Similarly, when packaged meat whose surfaces have been changed to oxygenated hemoglobin were sandwiched tightly between a pair of glass plates, their color rapidly changed to that of "reduced hemoglobin" (i.e., the iron of the hemoglobin is in the ferrous state). This suggested that the thin layer of oxygenated hemoglobin of the surface of the meat is not maintained unless there is a supply of oxygen on hand. The oxygen present in the oxygenated hemoglobin was consumed by the psychrophilic bacteria, loss by oxidation of extraneous salts or organic matter, or dissipated by simple diffusion. This indicated that any successful packaging film must have oxygen permeability and to establish the minimum oxygen requirements of meat packaged in films, fresh oxygenated beef was wrapped in a series of films of varying oxygen permeability. It was found that all films having an oxygen permeability value of 20 or more retained the red color of meat; those having an oxygen permeability value of less than 20 allowed the color to revert to that of hemoglobin itself. It was found that other films which would not maintain the oxygenated color had no adverse effect upon the meat, but merely caused the meat to change to deep purple in color because of their low oxygen permeability. Moreover, when the meat packaged with such discoloring was unwrapped and left exposed to the oxygen of the air, the bright oxygenated color returned in the standard "blooming" time.

If the wrapper is too moistureproof, i.e., if the water vapor permeability of the film is too low, a moist or slimy meat surface may result due to the setting up of favorable conditions for the growth of surface organisms. When fresh or smoked meats are packaged or wrapped in moistureproof materials, such as moistureproof regenerated cellulose film, it is found that these packages under normal refrigerating conditions become fogged and the contents are not visible. With the present trend for illuminated refrigerating showcases, this is a serious matter, since the desideratum of the transparent wrapper and of the illuminated showcase is defeated.

Another objection to a conventional moistureproof wrapping is that it so effectively preserves the meat that its color remains that of a freshly cut slice instead of the color usually associated with good quality meat. It is also noted that water, or water and blood, sometimes form a pool within the package and becomes unsightly. If, however, the wrapper is insufficiently moistureproof, the surface of the meat dries and the meat loses excessive weight and its desirable fresh appearance. When films with high water vapor permeability were used to package oxygenated beef which was then stored in a standard meat case, the water loss from the package was very high so that the meat dried and darkened very blackred in color. On the other hand, when a highly moistureproof film was used to package oxygenated beef, no weight loss was observed after 48 hours. In this moistureproof-type package, however, the formation of methemoglobin was invariably found to occur before it did in the less moistureproof package. It has been found that a water vapor permeability (PV) of 100–490 allows some drying of the meat surface and consequent retardation of bacterial growth which delays the undesirable appearance of methemoglobin, but is low enough to prevent excessive drying of the meat and resulting color darkening and weight loss.

Other factors to be taken into account in wrappers for packaging fresh meat are flexibility, durability, grease permeability, sealability and appearance of the packaging film. It is desirable to maintain the wrapper and the packaged meat in a substantially flexible condition at all times, especially when the food product is under refrigerating conditions. It is desirous that the enveloped food product withstand refrigerating temperatures without the wrapper becoming stiff and brittle, or suffer damage due to cracking, thus exposing the foodstuffs to dirt or germs. A wrapper that will remain soft and pliable at these low temperatures will be easier to handle without danger of breaking and will present an attractive wrapper at all times. Two distinctly different durability problems are connected with films in the meat wrap use. In the one, breakage has been reported during the wrapping operation. Here the film frequently has been found to shatter and tear when pulled over the corners of meat cuts. This is particularly true in areas of bone protrusion. Obviously, to prevent this type of damage, films with greater impact and tear strength are required. The other frequent durability complaint is that of the film puncturing on the package. The film frequently punctures as the package is picked up for purchase or inspection. The mechanism of this failure has been found to be due to the elongation of the film to its elastic limit followed by tenacity failure. To prevent this failure, the film must have either greater elongation or higher tensile strength or a combination of both. The permeability of packaging materials to grease is also of major concern in the packaging of fresh meats. Generally, the loss of grease from the meat by permeation of the package does not so seriously impair the quality of the meat as does a similar loss of water content or flavor and odor constituents. The staining of a food package with grease, or the actual appearance of a greasy film on the outside of a package, however, certainly detracts greatly from aesthetic appeal, which is a definite factor in customer acceptance. Satisfactory heat-seal strength levels for coated to coated and coated to uncoated seals should be obtainable at essentially normal sealing temperatures with little or no loss in strength under long storage conditions. Also, coating adhesion to the base sheet should remain strong at high humidities, an important factor in packaging meats. And finally, the packing film should have luster and sheen comparable to present regenerated cellulose films, and should be free of the stretched and puckered appearance. Similarly, the feel of "sogginess" experienced with many present day wrappers should not be present, and the tightness of the wrapper on the package should be maintained for longer periods of time.

An object of this invention, therefore, is to provide a method for preserving the color and condition of fresh meats. Another object is to provide for the packaging of fresh meat in a wrapper having the desirable combination of properties outlined above. Still another object is to provide a package comprising fresh meat enveloped in a transparent, flexible wrapper which does not adhere to the meat, which remains flexible and transparent under refrigerating conditions, and which has the degree of oxygen permeability and the degree of water vapor permeability effective to maintain the color and condition of the meat for relatively long periods of time. These and other objects will more clearly appear hereinafter.

The foregoing objects are realized by the present invention which, briefly stated, comprises wrapping fresh meat in a flexible transparent wrapper comprising regenerated cellulose base film uniformly coated on one side only with a composition comprising essentially polyethylene, the weight of coating being within the range of from 2.5 to 25, and preferably, from 2.5 to 7.5 grams per square meter of base film surface to yield a wrapper having a water vapor permeability within the range of 100–490, and an oxygen permeability value of at least 20, the uncoated surface of said base film being placed in contact with said fresh meat and constituting the inner surface of said wrapper.

A coating composition comprised essentially of polyethylene and cyclized natural rubber, in the proportions of from 99% to 90% polyethylene and from 1% to 10% of cyclized natural rubber, may be readily applied to the base film from volatile organic solvent solution to form an adherent coating, and constitutes the preferred coating for the wrappers of this invention. Coatings of polyethylene per se will be generally applied from a melt of polyethylene, e.g., by the extrusion technique described in TAPPI, 39, page 366 (June 1956). While the compositions comprising cyclized natural rubber adhere well to regenerated cellulose, it is preferred to enhance the bonding of the coating to the base film by first treating the base film with an anchoring resin or other suitable anchoring agent known to the art.

The polyethylene preferred for purposes of this invention is the normally solid, crystalline polymer of the formula $(CH_2)_x$ and includes the recently developed high-density polyethylene, i.e., having a density greater than 0.92–0.93 as well as polyethylene having lower densities. In general, however, any type of polyethylene may be used herein. For example, in addition to the preferred type of polyethylene, polyethylene formed by copolymerizing ethylene with minor amounts of aliphatic unsaturated hydrocarbons, such as propylene, butylene, isobutylene and the like, and polymers formed by copolymerizing ethylene with small quantities of other polymerizable compositions such as styrene, vinyl acetate and similar types of vinyl unsaturated compounds, are suitable for purposes of this invention.

The preferred cyclized natural rubber is "Pliolite NR." It is prepared by treating natural rubber with stannic chloride or chlorostannic acid (see Paper Trade Journal, page 96, February 23, 1939; and United States Patents Nos. 1,797,188, 1,846,247, 1,853,334 and 2,052,391). The chemical structure of cyclized natural rubber is described in "Rubber Age," April 1939. A cyclized natural rubber other than the "Pliolite NR" product may be used, e.g., "Alpex."

The composition of polyethylene and cyclized natural rubber in the prescribed proportions is most easily prepared in condition suitable for coating by dissolving the solids, i.e., polyethylene and cyclized natural rubber, in a common volatile organic solvent, e.g., toluene, or in a mixture of solvents. It is to be understood, of course, that any other suitable method for combining the essential ingredients of the composition may be employed, such as melt mixing, milling, dispersing in aqueous medium (water), etc.

The polyethylene may be modified by the addition of other ingredients for special purposes. For example, natural and synthetic plastic materials including natural or synthetic, cured or uncured rubber, waxes, resins, plasticizers and other synthetic resins, dyes and pigments, and mineral fillers such as finely divided calcium carbonate or titanium dioxides may be used as modifiers.

Various systems may be used to promote adhesion of these coatings to regenerated cellulose film. For example, the regenerated cellulose base sheet may be conditioned prior to receiving the polyethylene solution by pretreating it with an aqueous or solvent solution or dispersion of an unpolymerized or partially polymerized thermosetting resin (cf. Example I, U.S. Patent 2,533,-557). There may be used for this particular purpose the precondensates of melamine formaldehyde, ureaformaldehyde, ketone formaldehyde and phenol formaldehyde resins, and mixtures of the several resin types. Organic titanium compounds, applied as described in Haslam U.S. Patent 2,768,909, may be employed to facilitate adhesion of the coating. Likewise, laminating adhesives may be used to condition the regenerated cellulose prior to receiving the polyethylene.

The following specific examples will further illustrate the principles, practice and advantages of the present invention. Parts are by weight unless otherwise indicated.

EXAMPLE 1

Fourteen parts of polyethylene and 0.75 part of "Pliolite NR" were dissolved in 85 parts of toluene at 90°–110° C. Regenerated cellulose film approximately 0.0013" thick was first treated with guanidine-urea-formaldehyde resin as described in Example I of Chapman U.S. Patent 2,533,557, and then coated on one side with a toluene solution at 90°–110° C. and then dried. The coated film was then evaluated for coating thickness, appearance (luster), adhesion, heat-seal strength and durability, in accordance with the hereinafter described test procedures. The results are given in Tables I–IV.

The following test procedures were used to determine the adhesion, heat-seal strength and durability values:

*Adhesion.*—A strip of pressure-sensitive film tape is adhered to the coated film and is then stripped off. Coatings having good adhesion remain firmly attached to the base sheet. Coatings having poor adhesion are stripped off with the pressure-sensitive tape.

*Heat-seal strength.*—Heat-seal strength is a measure of the strength of the bond between the two films when they are sealed together by heat and pressure. For the purpose of comparison and definition, the following test is used to measure the strength of the heat-seal bond.

A piece of the coated film 47" x 50" with the grain running in the long direction is cut into pieces 4" x 3", handling all pieces by the corner so as not to contact the areas to be sealed. Two pieces of the superimposed film were then sealed together at each end, at right angles to the grain, with a sealing bar 0.75" wide heated to 120° C. at 20 p.s.i. pressure and 2 seconds' contact time.

The sealed sheets are then cut in half at right angles to the grain, and each half is cut into 1.5" wide strips, parallel to the grain, from the center of the sheets, resulting in 4 sets to be tested. Each set of the 1.5" wide sealed strips, after being conditioned in the desired atmosphere, is open at the free ends, placed in a Suter testing machine and pulled apart. The force in grams required to pull the strips apart is taken as a measure of the heat-seal bond strength.

*Durability.*—The term "durability" is used to define the resistance to shock or rough handling. The determination of durability is defined in U.S. Patent No. 2,279,339 (Peters).

Chuck roasts were used as the fresh meat for packaging and were as nearly alike as possible, their weight ranged around 3 pounds each, and they were not closely trimmed as to bone having the sharp chine bone left on. In each of the examples, two roasts were wrapped (uncoated regenerated cellulose side next to the meat) and one placed in a refrigerated case set to have a temperature ranging from 32° F. to 39° F.; this would represent the optimum conditions in the average retail store. The other roast was placed in a refrigerated case set to operate in the range of 35° F.–45° F.; this would represent unfavorable conditions such as could be encountered in a retail store probably during the summer months.

The packaged meats and wrapper were evaluated periodically for film appearance (wrinkle and pucker) (Table II), color retention (Table II) and weight loss (Table III). The on-the-package oxygen and water vapor permeability were also evaluated (Table I).

The following test procedures were used to determine the meat color and on-the-package oxygen and water vapor permeabilities and film appearance values:

*Oxygen permeability.*—Oxygen permeability value (OPV) of a film represents the grams of oxygen which will pass throug 100 square meters of the film in one hour under the test conditions. It is determined in the following manner:

A flat-bottomed, closed cell is provided with a sheet of filter paper covering the bottom surface (i.e., floor) of the cell, with means for introducing and withdrawing air from the space above the filter paper, and with inlet means below the sheet of filter paper for introducing liquid to saturate the filter paper. A sample of the film to be tested, coextensive in area with the sheet of filter paper, is placed over the filter paper, uncoated side down and in contact with the upper surface of the sheet of filter paper. A specific volume of bone-dry air is circulated over the top surface (coated) of the film at a constant rate, at a constant pressure (as close to atmospheric pressure as possible) and at a constant temperature. The circulating air passes through a dryer containing dry $CaSO_4$ and through a Beckmann paramagnetic oxygen analyzer which measures the oxygen content of the air. The filter paper at the bottom of the cell is saturated with a measured amount of pyrogallol 1.0 M solution having a pH NaOH 8.7. The amount of $O_2$ (oxygen) passing through the film into the pyrogallol solution over a 15 minute period is determined from the % $O_2$ readings over that period on the Beckman paramagnetic oxygen analyzer. The OPV is calculated from the consumption of oxygen during the 15 minute period. It is important that the circulating air be kept bone-dry since traces of moisture vapor will affect the evaluation adversely.

*Moisture permeability.*—For determining the on-the-package permeability of PVC (permeability after crumpling) was used to approach the on-the-package condition. For PVC, two 4" squares were cut from 4" strips, folded once, without creasing (keeping the coating to the inside); then the doubled sample was crushed into a small ball and squeezed twice at right angles. The sample was unfolded by pulling out the edges, but not smoothed. The sample showed irregular folds, with no uncreased areas greater than 1 centimeter square.

The determination of the moisture permeability was computed in the manner defined in U.S. Patent 2,147,180 (Ubben).

*Film appearance (Wrinkle and pucker).*—A rating system where samples are judged on the basis of 10 points for initial good appearance and grading the degradation in appearance with age of the package.

*Meat color.*—Same as above except the meat color is judged and assigned a numerical value from an initial 10 points downward with age of the package.

EXAMPLE 2

Nineteen parts of polyethylene and 1 part "Pliolite NR" were dissolved in 80 parts of toluene at 90°–110° C. Regenerated cellulose film approximately 0.0013" thick, pretreated with an anchoring resin as described in Example 1, was coated with toluene solution at 90°–110° C. and then dried. The dried coated film was evaluated in the same manner as in Example 1 with the results shown in Tables I–IV.

EXAMPLE 3

Nineteen parts of polyethylene and 1 part "Pliolite NR" were dissolved in 80 parts of toluene at 90°–110° C. The regenerated cellulose film approximately 0.0013" thick, pretreated with an anchor resin as described in Example 1, was then coated on one side with a toluene solution at 90°–110° C. and then dried. The dried coated film was evaluated in the same manner as in the previous examples with the results shown in Tables I–IV.

EXAMPLE 4

A regenerated cellulose film approximately 0.0013" thick, which had been treated with a urea formaldehyde anchorage resin, was melt coated with polyethylene on one side by the extrusion-coating technique described in TAPPI, 39, 366 (June 1956). The finished coated film with 5.8 gms. m.² coating thickness was evaluated in the same manner as in the previous examples with the results shown in Tables I–IV.

EXAMPLE 5

A regenerated cellulose film of approximately 0.0013" thick, was treated with a hexane solution of triisopropylstearyltitanate in accordance with the procedures described in U.S. Patent 2,768,909. The treated side was melt coated with polyethylene by the procedure described in Example 4. The resulting one-side polyethylene coated regenerated cellulose film with a 6 gms. m.² coating was evaluated in the same manner as in the previous examples with the results shown in Tables I–IV.

EXAMPLE 6

A commercially available, one-side nitrocellulose coated regenerated cellulose film, designated as a fresh meat wrapper, was evaluated in the same manner as in the previous examples with the results shown in Tables I–IV.

EXAMPLE 7

Another commercially available, one-side nitrocellulose coated regenerated cellulose film, designated as a fresh meat wrapper, was evaluated in the same manner as in the previous examples with the results shown in Tables I–IV.

EXAMPLE 8

A commercially available rubber hydrochloride film was evaluated in the same manner as in the previous examples with the results shown in Tables I–IV.

EXAMPLE 9

A commercially available polyethylene film, 0.001" in thickness, was evaluated in the same manner as in the previous examples with the results shown in Tables I–IV.

*Table I*

| Example | Coating Composition | Coating Thickness | Oxygen Permeability | Water Vapor Permeability, PVC | Adhesion | Heat-Seal Strength, Coated to Coated 35% | Heat-Seal Strength, Coated to Coated 81% | Durability Value |
|---|---|---|---|---|---|---|---|---|
| 1 | 14 Polyethylene/.75 Pliolite 85 Toluene. | 3 gm./m.² | 33.8 | 470 | G | 300 | 150 | 150 |
| 2 | 19 Polyethylene/1 Pliolite 80 Toluene (#310). | 5.6 gm./m.² | 26.3 | 350 | G | 450 | 200 | 170 |
| 3 | 19 Polyethylene/1 Pliolite 80 Toluene (#263). | 7.5 gm./m.² | 20.0 | 270 | G | 550 | 300 | 180 |
| 4 | Polyethylene/Melt Coating | 5.8 gm./m.² | 26.0 | 340 | G | 460 | 250 | 170 |
| 5 | do | 6.0 gm./m.² | 25.8 | 330 | G | 600 | 400 | 170 |
| 6 | One-Side Nitrocellulose Coated Regenerated Cellulose Film. | 3 gm./m.² | 7.2 | 160 | G | 250 | 150 | 125 |
| 7 | do | 3 gm./m.² | 9.4 | 300 | G | 250 | 150 | 125 |
| 8 | Rubber Hydrochloride Film | 0.0090" | 5.9 | 230 |  | 250 | 250 | 200 |
| 9 | Polyethylene | 0.001" | 9.1 | 57 |  | 500 | 500 | 200 |

*Table II.—Film appearance (wrinkle and pucker)*

(CASE I) (32°–39° F.)

| Example | Initial | 1st Day | 2nd Day | 3rd Day | 4th Day | 5th Day | 6th Day |
|---|---|---|---|---|---|---|---|
| 1 | 10/10 | 10/10 | 9.5/9 | 9.5/9 | 9.2/9 | 8.3/9 | 7.5/8 |
| 2 | 10/10 | 9.3/9.6 | 9/9 | 8.3/8.3 | 8.3/8.3 | 8.3/8.3 | 8.3/8.3 |
| 3 | 10/10 | 9/9 | 9/9 | 9/8.6 | 9/8.6 | 9/8.6 | 8/8.3 |
| 4 | 10/10 | 9.3/9.6 | 9/9 | 8.3/8.3 | 8.3/8.3 | 8.3/8.3 | 8.3/8.3 |
| 5 | 10/10 | 9.4/9.6 | 9.1/9 | 8.4/8.4 | 8.4/8.4 | 8.4/8.4 | 8.4/8.4 |
| 6 | 10/10 | 9.6/9.6 | 9.6/9.6 | 9/8.3 | 8.3/8.3 | 8.3/8.3 | 8/8.3 |
| 7 | 10/10 | 9.6/9.6 | 8.6/9.6 | 8.6/8.3 | 8.3/8.3 | 8.3/8.3 | 7.3/8.3 |
| 8 | 8/8 | 7.3/8 | 7.6/6 | 6/6 | 6/6 | 6/6 | 6/6 |
| 9 | 9.5/9 | 9.5/9 | 9.5/9 | 9.5/9 | 9/9 | 8/9 | 7/7 |

(CASE II) (35°–45° F.)

| | | | | | | | |
|---|---|---|---|---|---|---|---|
| 1 | 10/10 | 10/10 | 9.5/9 | 9.5/9 | 8.6/9 | 8.3/9 | |
| 2 | 9/9 | 9/9 | 8/8.6 | 8/8.3 | 8/8 | 8/8 | |
| 3 | 9/9 | 9/9 | 8.3/9 | 8/9 | 8/9 | 8/9 | |
| 4 | 9/9 | 9/9 | 8.2/8.6 | 8/8.3 | 8/8 | 8/8 | |
| 5 | 9/9 | 9/9 | 8.6/9 | 8/8.6 | 8/8 | 7/8 | |
| 6 | 8.6/9 | 8.6/9 | 8.3/9 | 8/8.6 | 8/8 | 8/8 | |
| 7 | 10/10 | 9.3/9.3 | 9/8.6 | 8.3/8.6 | 8.3/8.3 | 7.6/8.3 | |
| 8 | 7.6/8 | 7.3/8 | 6/7.3 | 6/7.3 | 6/7 | 6/7 | |
| 9 | 9.5/9 | 9.5/9 | 9.5/9 | 9.5/9 | 9.5/9 | 8.6/9 | |

*Table III.—Percent weight loss*

(CASE I) (32°–39° F.)

| Example | 1st Day | 2nd Day | 3rd Day | 4th Day | 5th Day | 6th Day |
|---|---|---|---|---|---|---|
| 1 | 0.63 | 1.13 | 1.48 | 1.89 | 2.43 | 2.99 |
| 2 | 0.5 | 1.0 | 1.4 | 1.6 | 1.9 | 2.2 |
| 3 | 0.0 | 0.75 | 0.8 | 1.1 | 1.2 | 1.8 |
| 4 | 0.5 | 1.0 | 1.4 | 1.6 | 1.9 | 2.2 |
| 5 | 0.5 | 0.9 | 1.3 | 1.5 | 1.8 | 2.1 |
| 6 | 0.7 | 1.8 | 3.4 | 4.7 | 6.1 | 8.3 |
| 7 | 0.7 | 1.6 | 3.0 | 4.0 | 5.0 | 6.5 |
| 8 | 0.0 | 0.75 | 1.1 | 1.2 | 1.5 | 1.8 |
| 9 | 0.36 | 0.68 | 0.94 | 1.29 | 1.52 | 1.84 |

(CASE II) (35°–45° F.)

| 1 | 0.48 | 0.85 | 1.02 | 1.50 | 1.77 | 2.24 |
| 2 | 0.35 | 0.9 | 1.3 | 1.6 | 2.1 | 2.4 |
| 3 | 0.00 | 0.35 | 0.40 | 0.50 | 0.70 | 1.0 |
| 4 | 0.35 | 0.9 | 1.3 | 1.6 | 2.1 | 2.4 |
| 5 | 0.3 | 0.9 | 1.2 | 1.5 | 2.1 | 2.4 |
| 6 | 1.00 | 2.4 | 3.8 | 4.7 | 6.7 | 9.3 |
| 7 | 1.4 | 3.2 | 4.5 | 5.8 | 7.3 | 9.0 |
| 8 | 0.4 | 1.0 | 1.4 | 1.7 | 2.1 | 2.5 |
| 9 | 0.14 | 0.45 | 0.65 | 1.13 | 1.27 | 1.55 |

*Table IV.—Meat color packages*

(CASE I) (32°–39° F.)

| Example | Initial | 1st Day | 2nd Day | 3rd Day | 4th Day | 5th Day | 6th Day |
|---|---|---|---|---|---|---|---|
| 1 | 10 | 8.3 | 7.6 | 7.3 | 7.3 | 6.0 | 4.0 |
| 2 | 10 | 8.6 | 8.0 | 7.3 | 6.0 | 4.6 | 4.0 |
| 3 | 10 | 8.3 | 8.3 | 7.6 | 7.0 | 6.0 | 5.3 |
| 4 | 10 | 8.6 | 8.0 | 7.3 | 6.0 | 4.6 | 4.0 |
| 5 | 10 | 8.7 | 8.1 | 7.3 | 5.9 | 4.5 | 4.0 |
| 6 | 10 | 8.3 | 6.6 | 6.3 | 5.0 | 3.6 | 3.3 |
| 7 | 10 | 7.3 | 6.6 | 6.6 | 5.3 | 4.3 | 4.0 |
| 8 | 10 | 7.3 | 6.0 | 5.3 | 4.0 | 3.0 | 3.0 |
| 9 | 10 | 8.3 | 7.6 | 7.3 | 7.3 | 7.3 | 4.6 |

(CASE II) (35°–45° F.)

| 1 | 10 | 8.0 | 7.6 | 6.6 | 4.6 | 2.2 | 2.0 |
| 2 | 10 | 7.6 | 5.6 | 5.0 | 3.0 | 3.0 | 3.0 |
| 3 | 10 | 7.6 | 5.3 | 5.0 | 4.0 | 4.0 | 4.0 |
| 4 | 10 | 7.6 | 5.6 | 5.0 | 3.0 | 3.0 | 3.0 |
| 5 | 10 | 7.5 | 5.5 | 4.9 | 3.0 | 3.0 | 3.0 |
| 6 | 10 | 5.3 | 4.6 | 3.6 | 3.0 | 3.0 | 2.3 |
| 7 | 10 | 7.3 | 6.3 | 5.6 | 3.0 | 3.0 | 2.3 |
| 8 | 10 | 5.6 | 4.0 | 3.3 | 2.6 | 2.6 | 2.6 |
| 9 | 10 | 8.3 | 7.6 | 6.6 | 6.6 | 4.6 | 2.0 |

I claim:

1. A method for preserving the color and condition of fresh meats which comprises wrapping fresh meat in a transparent flexible wrapper comprising a regenerated cellulose base film uniformly coated on one side only with a composition consisting essentially of polyethylene and cyclized natural rubber in the proportion of 99% to 90% by weight of polyethylene and from 1% to 10% of cyclized natural rubber, the weight of coating being within the range of from 2.5 to 25 grams per square meter of base film surface, said wrapper having a water vapor permeability within the range of 100–490 and an oxygen permeability value of at least 20, the uncoated surface of said base film being placed in contact with the fresh meat and constituting the inner surface of said wrapper.

2. A package comprising fresh meat wrapped in a transparent flexible wrapper comprising regenerated cellulose base film having on one side only a uniform coating of a composition consisting essentially of polyethylene and cyclized natural rubber in the proportion of from 1% to 10% of cyclized natural rubber, the weight of said coating being within the range of from 2.5 to 25 grams per square meter of film surface, said wrapper having a water vapor permeability within the range of 100–490 and an oxygen permeability value of at least 20, the uncoated side of said film constituting the inner surface of said wrapper.

References Cited in the file of this patent

UNITED STATES PATENTS

| | | |
|---|---|---|
| 2,337,666 | Koonz et al. | Dec. 28, 1943 |
| 2,697,664 | Goeser et al. | Dec. 21, 1954 |
| 2,714,557 | Mahaffy | Aug. 2, 1955 |
| 2,866,710 | Dowd et al. | Dec. 30, 1958 |

OTHER REFERENCES

"Food Technology," April 1955, pp. 194, 195 and 196, article entitled Discoloration of Fresh Red Meat and Its Relationship to Film Oxygen Permeability.